Jan. 7, 1958

R. E. DOWNS 2,819,128

BEARING

Filed Dec. 17, 1953

INVENTOR.

Russell E. Downs

BY Mitchell Bichert

ATTORNEYS

United States Patent Office 2,819,128
Patented Jan. 7, 1958

2,819,128

BEARING

Russell E. Downs, Kensington, Conn., assignor to Fafnir Bearing Company, New Britain, Conn., a corporation of Connecticut Application December 17, 1953, Serial No. 398,804

1 Claim. (Cl. 308—194)

My invention relates to a bearing and more particularly to a flange mounting for a bearing.

In many situations, particularly in connection with agricultural machinery, antifriction bearings are mounted against the wall through which a shaft passes. Chaff, straw or other debris often works through the opening about the shaft and collects against the bearing to such an extent that the bearing seals are sometimes forced and ruined.

It is an object of my invention to provide a bearing mounting which may be secured to a wall and which spaces the bearing away from the wall and leaves ample space for chaff or other debris to fall away and not collect adjacent to the bearing.

It is another object to provide a bearing which is not likely to become fouled with straw, chaff or other like debris which so often collects about a shaft and adjacent to the bearing.

Other objects and various features of novelty and invention will be hereinafter pointed out or will become apparent to those skilled in the art.

In the drawings which show, for illustrative purposes only, a preferred form of the invention:

Figure 1:
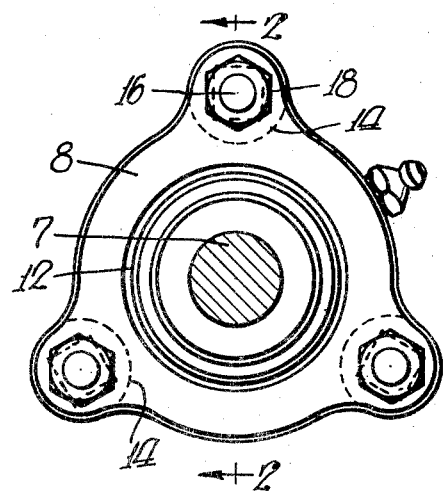
Fig. 1 is an axial view in elevation of a bearing mounting illustrating the invention.
Figure 2:
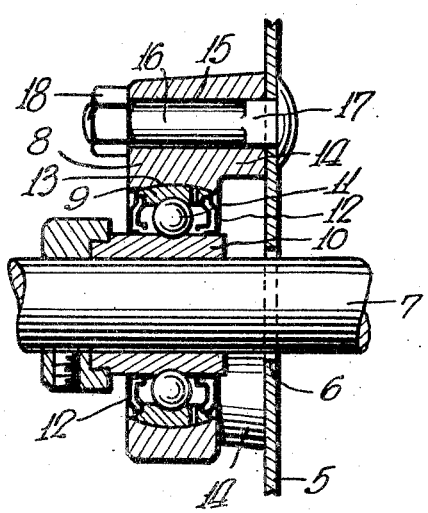
Fig. 2 is a sectional view taken substantially in the plane of the line 2—2 of Fig. 1.

In the form shown the bearing is mounted on a wall 5 which may be part of an agricultural machine and which has a shaft opening 6 through which a shaft 7 may pass. The bearing mounting, which is termed a flange mounting, consists in the form shown of a housing 8, having an opening for receiving the outer ring 9 of an anti-friction bearing which consists of said outer ring 9 and inner ring 10 with interposed antifriction bearing members 11. The bearing is preferably sealed as by means of a labyrinth seal 12 as will be understood.

The housing opening 13 for receiving the bearing is preferably of generally spherical form and the outer bearing ring is of the same general form so that the bearing may self-align to some extent in the housing. The housing itself has projecting mounting feet 14, there being three such feet in the particular form shown. These mounting feet hold the housing portion and the bearing a substantial distance away from the wall 5 upon which the bearing unit is mounted. The housing and foot portions may have through apertures 15 which may be square in cross-section to accommodate carriage bolts 16 which may have a partially squared shank 17 as illustrated. Nuts 18 on the carriage bolts serve to hold the entire flange unit on the mounting wall 5. The shaft 7 passes through the inner ring 10 and the latter is held on the shaft as by means of an eccentric locking collar 18 of well-known form.

In operation, straw, chaff and other debris often works its way through the aperture 6 surrounding the shaft 7 and if the bearing is located close to the wall 5 any straw or stringy material tends to wrap about the shaft and the bearing and press against the seal so as to completely foul the bearing. Stringy material, when it starts to wrap, forms a network for holding other and similar debris so that the fouling condition is enhanced, so an ordinary bearing mounting is wholly unsatisfactory for the use indicated.

In my improved construction it will be seen that the bearing itself and the seals are mounted a distinct and substantial distance away from the wall 5 so that any foreign matter either working through the opening 6 or approaching the shaft from the other side of the wall will have a tendency to fall away in the large space between the wall and the bearing and not wrap around the shaft or clog between the wall and the bearing so as to foul the latter. If any stringy material and foreign matter should happen to wrap about the shaft and bearing and tend to clog or foul the bearing, it will be seen that, due to the large space between the wall 5 and the bearing, the foreign matter can easily be dislodged and the bearing cleared.

While the invention has been described in considerable detail and a preferred form illustrated, it is to be understood that changes and modifications may be made within the scope of the invention as defined in the appended claim.

I claim:

In a bearing mounting, a generally flat body having a transverse bearing receiving opening therein, a bearing comprising inner and outer bearing rings with interposed antifriction bearing members mounted in said opening, a wall having a shaft opening therein, a shaft fitting in said inner bearing ring and passing through said shaft opening, said generally flat body having a plurality of circumferentially spaced apart feet thereon and extending axially and seated on said wall so as to space said flat body and bearing well away from said wall, the space between said wall and said bearing being free and unobstructed and said feet being located so as to leave a free space beneath said shaft, where the latter passes through said opening in said wall and up to said inner ring, whereby stringy material is not likely to wind on said shaft adjacent said bearing, and foreign matter will fall out.

References Cited in the file of this patent

UNITED STATES PATENTS

| 1,368,050 | Plaisted | Feb. 8, 1921 |
| 2,188,510 | Lopsley | Jan. 30, 1940 |
| 2,290,213 | Shafer | July 21, 1942 |
| 2,622,945 | Nickle et al | Dec. 23, 1952 |
| 2,653,063 | Arndt et al. | Sept. 22, 1953 |

FOREIGN PATENTS

| 259,282 | Great Britain | Oct. 1, 1926 |